US009980002B2

(12) United States Patent
Yan

(10) Patent No.: US 9,980,002 B2
(45) Date of Patent: May 22, 2018

(54) INTELLIGENT TV CONTROL SYSTEM AND IMPLEMENTATION METHOD THEREOF

(71) Applicant: SHENZHEN SKYWORTH-RGB ELECTRONIC CO., LTD., Shenzhen (CN)

(72) Inventor: Ge Yan, Shenzhen (CN)

(73) Assignee: Shenzhen Skyworth-RGB Electronic Co., Ltd., Shenzhen (CN)

( * ) Notice: Subject to any disclaimer, the term of this patent is extended or adjusted under 35 U.S.C. 154(b) by 0 days. days.

(21) Appl. No.: 15/328,561

(22) PCT Filed: Jan. 6, 2016

(86) PCT No.: PCT/CN2016/070273
§ 371 (c)(1),
(2) Date: Jan. 24, 2017

(87) PCT Pub. No.: WO2017/088287
PCT Pub. Date: Jun. 1, 2017

(65) Prior Publication Data
US 2017/0272815 A1   Sep. 21, 2017

(30) Foreign Application Priority Data
Nov. 24, 2015  (CN) .......................... 2015 1 0823007

(51) Int. Cl.
H04N 7/16       (2011.01)
H04N 21/442    (2011.01)
(Continued)

(52) U.S. Cl.
CPC ... *H04N 21/44218* (2013.01); *G08B 21/0446* (2013.01); *H04N 21/42201* (2013.01);
(Continued)

(58) Field of Classification Search
None
See application file for complete search history.

(56) References Cited

U.S. PATENT DOCUMENTS 5,153,580 A * 10/1992 Pollack ............... G04G 15/006
340/12.22
5,945,988 A *  8/1999 Williams ............. G11B 27/105
348/E17.005
(Continued)

FOREIGN PATENT DOCUMENTS

CN    102523401 A    6/2012
CN    203107107 U    8/2013
(Continued)

OTHER PUBLICATIONS

The World Intellectual Property Organization (WIPO) International Search Report for PCT/CN2016/070273 dated Aug. 12, 2016 p. 1-4.

*Primary Examiner* — An Son P Huynh
(74) *Attorney, Agent, or Firm* — Anova Law Group, PLLC

(57) ABSTRACT

The present invention provides an intelligent TV control system and implementation method thereof, through a group of pressure sensors, pressure data and vital signs data of a plurality of body parts of user are collected; before being transmitted to terminal of intelligent TV, which then processes pressure data and vital signs data received from terminal of pressure sensors, and obtains sitting posture information and mental state information of user, before sending out a corresponding sitting posture adjustment advice or controlling to change play state of TV, based on sitting posture information and mental state information. The system and implementation method thereof, as described in present invention, by obtaining user state information, and controlling TV to adjust parameters automatically according to user state information, has improved an
(Continued)

intelligence of intelligent TV, and provided convenience to users when using intelligent TV.

10 Claims, 2 Drawing Sheets

(51) Int. Cl.
    *G08B 21/04*     (2006.01)
    *H04N 21/422*     (2011.01)
    *H04N 21/45*     (2011.01)
    *H04N 21/441*     (2011.01)
    *H04N 21/485*     (2011.01)

(52) U.S. Cl.
    CPC ....... *H04N 21/441* (2013.01); *H04N 21/4524* (2013.01); *H04N 21/4532* (2013.01); *H04N 21/4852* (2013.01); *H04N 21/4854* (2013.01)

(56) References Cited

U.S. PATENT DOCUMENTS

| | | | | |
|---|---|---|---|---|
| 9,094,539 | B1* | 7/2015 | Noble | H04N 7/00 |
| 9,667,584 | B2* | 5/2017 | Archibong | H04L 65/403 |
| 2002/0073417 | A1* | 6/2002 | Kondo | H04N 7/002 725/10 |
| 2007/0285364 | A1* | 12/2007 | Nakagawa | H04N 5/44591 345/87 |
| 2008/0062008 | A1* | 3/2008 | Morimoto | G01C 21/36 340/936 |
| 2009/0131764 | A1* | 5/2009 | Lee | A61B 5/0205 600/301 |
| 2009/0149721 | A1* | 6/2009 | Yang | A61B 5/0002 600/301 |
| 2010/0071000 | A1* | 3/2010 | Amento | H04N 7/173 725/39 |
| 2010/0295839 | A1* | 11/2010 | Nagaya | G06F 1/3265 345/212 |
| 2011/0069940 | A1* | 3/2011 | Shimy | G11B 27/105 386/296 |
| 2011/0321091 | A1* | 12/2011 | Lee | H04N 13/0454 725/39 |
| 2012/0113220 | A1* | 5/2012 | Otsuka | H04N 13/0029 348/43 |
| 2012/0147154 | A1* | 6/2012 | Matsubara | H04N 13/0409 348/51 |
| 2013/0036200 | A1* | 2/2013 | Roberts | H04L 65/4076 709/219 |
| 2013/0086602 | A1* | 4/2013 | Mikan | H04L 67/24 725/10 |
| 2013/0173765 | A1* | 7/2013 | Korbecki | H04N 21/42209 709/221 |
| 2013/0205311 | A1* | 8/2013 | Ramaswamy | H04N 21/44213 725/9 |
| 2013/0298146 | A1* | 11/2013 | Conrad | H04N 21/252 725/12 |
| 2014/0363000 | A1* | 12/2014 | Bowden | H04H 60/33 381/56 |
| 2015/0039259 | A1* | 2/2015 | Park | G01L 1/00 702/139 |
| 2015/0068069 | A1* | 3/2015 | Tran | H04B 1/385 36/136 |
| 2015/0106833 | A1 | 4/2015 | Kang et al. | |
| 2015/0106866 | A1* | 4/2015 | Fujita | H04N 21/4126 725/133 |
| 2015/0138044 | A1* | 5/2015 | Rawlinson | G06F 3/1454 345/2.2 |
| 2015/0296243 | A1* | 10/2015 | Ikeda | H04N 21/41422 725/75 |
| 2016/0089028 | A1* | 3/2016 | Chatterjee | A61B 5/0002 340/870.07 |
| 2016/0134938 | A1* | 5/2016 | Miyazaki | H04N 7/142 348/14.07 |
| 2016/0157612 | A1* | 6/2016 | Lim | A63J 25/00 297/217.2 |
| 2016/0274381 | A1* | 9/2016 | Haddadi | G02C 11/10 |
| 2017/0020438 | A1* | 1/2017 | Wang | A61G 7/057 |
| 2017/0049360 | A1* | 2/2017 | Wu | A47C 31/00 |

FOREIGN PATENT DOCUMENTS

| | | |
|---|---|---|
| CN | 103393416 A | 11/2013 |
| CN | 104080008 A | 10/2014 |

* cited by examiner

Building a wireless connection between the group of pressure sensors and the intelligent TV, and storing the body weight information of the user in the intelligent TV — S1

The group of pressure sensors collects the pressure data and vital signs data of a plurality of body parts of the user; before delivering to the terminal of intelligent TV — S2

The intelligent TV compares and analyzes the pressure data and vital signs data received from the terminal of pressure sensors to the stored body weight information, before obtaining the sitting posture information and the mental state information of the user, followed by transmitting a plurality of corresponding advices for adjusting the sitting posture or controlling a play state of the TV, based on the sitting posture information and the mental state information — S3

FIG. 3

INTELLIGENT TV CONTROL SYSTEM AND IMPLEMENTATION METHOD THEREOF

CROSS-REFERENCES TO RELATED APPLICATIONS

This application is a national stage application of PCT Patent Application No. PCT/CN2016/070273, filed on Jan. 6, 2016, which claims priority to Chinese Patent Application No. 2015108230078, filed on Nov. 24, 2015, the content of all of which is incorporated herein by reference.

FIELD OF THE INVENTION

The present invention relates to the field of intelligent TV control technology, and, more particularly, to an intelligent TV control system and implementation method thereof.

BACKGROUND

A plurality of users has a habit of sitting in a sofa, on a chair, or even lying in a bed, when watching a TV program or using a cell phone/tablet. However, if the user keeps in a same sitting position for a long time, it may hurt his body, especially when his sitting position is not right, for example, a long time forward tilting of one's body, may hurt his cervical spine, or a long time sitting on a left or right, causing a weight of the body to be taken by his arm, which may hurt his shoulder.

In the prior art, there is no method of controlling a TV automatically, according to the sitting position of a user, and notifying the user to adjust his sitting position, or no method of automatically adjusting a plurality of setting parameters of the TV, after obtaining a mental state of the user. Thus, an intelligence of the TV in the prior art may not satisfy a requirement of the user.

Therefore, the current technology needs to be improved and developed.

BRIEF SUMMARY OF THE DISCLOSURE

According to the above described defects in the prior art, the purpose of the present invention is providing an intelligent TV control system and implementation method thereof, in order to overcome the defects in the prior art that, an intelligent TV may not automatically adjust the TV setting parameters according to the sitting position or mental state of a user.

In order to achieve the above mentioned goals, the technical solution of the present invention to solve the technical problems is provided. An intelligent TV control system includes an intelligent TV and a pressure data obtaining device comprising a plurality of pressure sensors in a group. The pressure sensor comprises a data collection module, a communication connection module and a data transmission module. The data collection module is applied to collecting a plurality of pressure data on a plurality of body parts of a user, and a plurality of vital signs data of the user. The communication connection module is applied to establishing a wireless connection with a TV wireless communication module. The data transmission module is applied to transmitting the obtained pressure data and vital signs data to a terminal of intelligent TV, through the wireless connection.

The intelligent TV comprises a TV wireless communication module, a user information storage module, a data processing module and an instruction delivery and control module. The TV wireless communication module is applied to establishing the wireless connection with the communication connection module. The user information storage module is applied to storing an information of a body weight of the user. The data processing module is applied to obtaining the pressure data and vital signs data from the data transmission module, and comparing the pressure data with the stored body weight information of the user, to obtain a sitting posture information of the user, as well as obtaining a mental state information of the user according to the vital signs data. The instruction delivery and control module is applied to delivering a corresponding TV instruction based on the sitting posture information and mental state information, before controlling the intelligent TV to execute a plurality of corresponding operation.

The pressure sensor further includes a GPS positioning module, applied to locating a current position, and transmitting the position information to the terminal of intelligent TV through the data transmission module.

The intelligent TV further include a user information storage module and a user identification module. The user information storage module is applied to storing a history information on the user watched TV, as well as analyzing an information on a user loved program according to the history information on the user watched TV. The user identification module is applied to comparing the pressure data and the vital signs data obtained from the terminal of pressure sensors with the body weight information of the user stored in the user information storage module, before identifying the user currently watching the TV.

When the user is sitting in a sofa, the pressure data are obtained by the pressure sensors set under the armrest of the sofa, under the cushion of the sofa and behind the backrest of the sofa, or by the pressure sensors arranged on the user body. When the user is lying in a bed, the vital signs data are obtained by the pressure sensors set under the armrest of the bed, under the cushion of the bed and behind the backrest of the bed, or by the pressure sensors arranged on the user body.

The instruction delivery and control module further comprises a screen adjustment and control unit, applied to controlling the TV screen to adjust correspondingly, according to the user sitting posture information obtained from the data processing module; and an instruction control unit, applied to controlling to turn the TV on or off, controlling to increase or decrease a volume of the TV, controlling to increase or decrease a screen brightness of the TV, according to the mental state information of the user.

The present invention also provides an intelligent TV control system implementation method. A wireless connection is established between the group of pressure sensors and the intelligent TV, and the body weight information of the user is stored in the intelligent TV. The group of pressure sensors collects the pressure data and vital signs data of a plurality of body parts of the user; before delivering to the terminal of intelligent TV. The intelligent TV compares and analyzes the pressure data received from the terminal of pressure sensors with the stored body weight information of the user, before obtaining the sitting posture information of the user, and the mental state information of the user based on the vital signs data, followed by transmitting a plurality of corresponding advices for adjusting the sitting posture or controlling a play state of the TV, based on the sitting posture information and mental state information.

At a same time of a data obtaining module of the group of pressure sensors collecting the pressure data and the vital signs data of a plurality of body parts of the user, the data obtaining module further positions its current location, before transmitting its location information to the terminal of intelligent TV.

Before setting up the wireless connection between the group of pressure sensors and the intelligent TV, the body weight information of the user and the user loved program information analyzed through the history information of the user watched TV is further stored. The pressure data and the vital signs data received by the terminal of pressure sensors are compared with the stored body weight information of the user, before identifying the user currently watching TV.

The step of transmitting a plurality of corresponding advices for adjusting the sitting posture or controlling a play state of the TV, based on the sitting posture information and mental state information includes: if it is analyzed that, the sitting posture information of the user is on a left, then the TV screen is controlled to turn right; if it is analyzed that, the sitting posture information of the user is on a right, then the TV screen is controlled to turn left; if it is analyzed that, the sitting posture information of the user is leaning forward, then the TV screen is controlled to move forward.

The step of transmitting a plurality of corresponding advices for adjusting the sitting posture or controlling a play state of the TV, based on the sitting posture information and mental state information includes: if it is analyzed that, the mental state information of the user is approaching sleeping from quiet, then the TV is controlled to lower the TV volume gradually according to a preset period, and lower the brightness of the TV screen gradually as well; if it is analyzed that, the mental state information of the user is sleeping, then the TV is controlled to shut down; if it is analyzed that, the mental state information of the user is going to be exciting from quiet, the TV is then controlled to increase the TV volume gradually according to a preset period, and increase the brightness of the TV screen gradually as well; if it is analyzed that, the mental state information of the user is going to be quiet from sleeping, the TV is then controlled to turn on.

The present invention provides an intelligent TV control system and implementation method thereof, through a group of pressure sensors, the pressure data and vital signs data of a plurality of body parts of the user are collected; before being transmitted to the terminal of intelligent TV, which then processes the pressure data and the vital signs data received from the terminal of pressure sensors, and obtains the sitting posture information and mental state information of the user, before sending out a corresponding sitting posture adjustment advice or controlling to change the play state of the TV, based on the sitting posture information and the mental state information. The system and the implementation method thereof, as described in the present invention, by obtaining the user state information, and controlling the TV to adjust parameters automatically according to the user state information, has improved an intelligence of the intelligent TV, and provided convenience to users when using the intelligent TV.

BRIEF DESCRIPTION OF THE DRAWINGS

FIG. 3 illustrates a flowchart on a step of an implementation method of a control system of an intelligent TV as provided in the present invention.

DETAILED DESCRIPTION OF EMBODIMENTS

The present invention provides an intelligent TV control system and implementation method thereof, in order to make the purpose, technical solution and the advantages of the present invention clearer and more explicit, further detailed descriptions of the present invention are stated here, referencing to the attached drawings and some preferred embodiments of the present invention. It should be understood that the detailed embodiments of the invention described here are used to explain the present invention only, instead of limiting the present invention.

Figure 1:
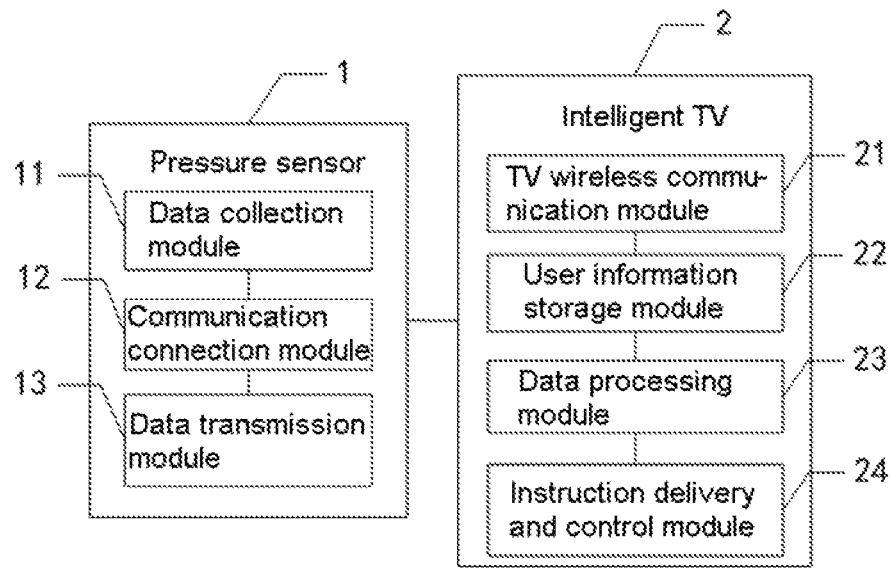
FIG. 1 illustrates a schematic diagram on a principle of a control system of an intelligent TV as provided in the present invention.

The present invention provides an intelligent TV control system, shown as FIG. 1. The system comprises: an intelligent TV 2 and a pressure data obtaining device comprising a plurality of pressure sensors 1 in a group. The pressure sensor 1 comprises: a data collection module 11, applied to collecting a plurality of pressure data on a plurality of body parts of a user, and a plurality of vital signs data of the user; a communication connection module 12, applied to establishing a wireless connection with a TV wireless communication module; a data transmission module 13, applied to transmitting the obtained pressure data and vital signs data to a terminal of intelligent TV, through a wireless way.

The intelligent TV 2 comprises: a TV wireless communication module 21, applied to establishing a wireless connection with the communication connection module; a user information storage module 22, applied to storing an information of a body weight of the user; a data processing module 23, applied to obtaining the pressure data and vital signs data from the data transmission module, and comparing the pressure data with the stored body weight information of the user, to obtain a sitting posture information of the user, as well as obtaining a mental state information of the user; and an instruction delivery and control module 24, applied to delivering a corresponding TV instruction based on the sitting posture information and mental state information, before controlling the intelligent TV to execute a corresponding operation.

Specifically, the group of pressure sensors may be applied together to obtaining the sitting posture of the user. Each pressure sensor may obtain a stress situation of the user. For example, when the user is sitting in a sofa, the pressure sensors set below a cushion of the sofa, may obtain a pressure value applied by the user, the pressure sensors set in an armrest or backrest of the sofa. The pressure sensors set may obtain a pressure from the user to the armrest or backrest, based on the pressure data obtained by the body weight information of the user and the above pressure sensors. It may be determined that if the sitting posture of the user is on right or on left (an imbalanced forces distribution may likely be caused by a body tilt, and a long time body tilt is not good to blood circulation, as well as hurting a cervical spine). Through sensors arranged in the backrest, it may be clear whether the user is leaning on the backrest or not, or whether a force distribution on the backrest is equal or not. If the user is not leaning on the backrest, then all forces will be taken by his buttocks and thighs, and keeping such a sitting posture for a long time will not be good to his body health; if the forces on the backrest are not equally distributed, then it may bring heavy harms to cervical spines and shoulders.

The pressure sensor delivers the pressure data obtained to a terminal of the intelligent TV, which may then analysis the pressure data received, before deciding whether the sitting posture of the user is right or not, if it is not, then the TV may remind the user to adjust his sitting posture on screen of the TV.

Figure 2:
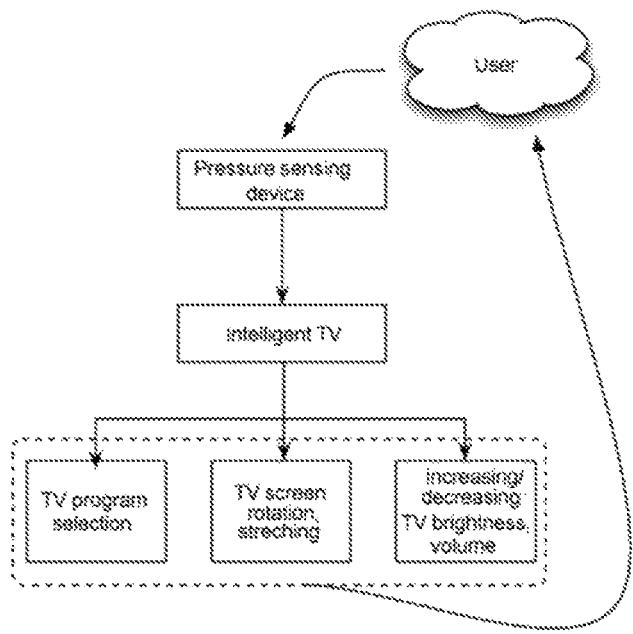
FIG. 2 illustrates a schematic diagram on an embodiment of the control system of an intelligent TV as provided in the present invention.

Specifically, in an implementation process, referencing to FIG. 2, the pressure sensor packs and delivers a data package of the pressure data to the intelligent TV, which obtains the data package containing pressure data from a terminal of pressure sensor through a Bluetooth or ZigBee connection. A program installed in the TV analyzes the data package and obtains the pressure data inside. Before analyzing, if the analyzed result is that the user sits on left or on right, then the TV emits immediately an instruction of rotating the screen for a certain angle, to help the user turn back to a balanced state (if the user is sitting on the left, the TV screen will turn right, so as to make the user turn his body right intensively). If the analyzed result shows the backrest is not taking any forces, or few forces, then the TV sends out an instruction of moving the screen closer to the user immediately, so as to help the user lean back (if the user is sitting forward, then the TV screen closes to the user, making the user lean back and his back take forces). If the user did not make any adjustment to his sitting posture after the TV has emitted the instruction for adjustment, then the TV will stop playing a content current on show, instead of showing a plurality of notices and advices on the sitting posture of the user, until the user finished adjusting his sitting posture, before the TV continuing to play the program content.

The pressure sensor is applied to obtaining not only the pressure data, but also the mental state information of the user. The pressure sensor may further obtain a plurality of vital signs data information of the user, including a heartbeat, pulse and epidermal temperature. These information may be applied to determining a body excitement of the user at this moment. For a situation of the heartbeat and pulse of the user approaching to stable and weaker, the body of the user is going to a sleep and quiet. For a situation of the heartbeat and pulse of the user approaching to stronger, the body of the user is exciting. These heartbeat and pulse data of the user, together with the temperature data will also be packed with the pressure data and delivered to the intelligent TV, which will analyze the data package after receiving, to decide if the mental state information of the user is sleeping, quiet or exciting. If the data shows the user is entering a sleeping state, then a brightness of the TV gets weaker gradually, and a voice gets smaller gradually, and, the TV may even send an instruction to a plurality of other intelligent devices around to make an environment for sleep together. For example, turning off an electric light, closing a window curtain to make an environment brightness weaker, turning on an AC and controlling a temperature to suit for sleep. When the data obtained by the pressure sensor is enough to make sure the user is sleeping, the intelligent TV is then controlled to be a standby or off state. If the analyzed vital signs data shows the user is exciting, the TV may then make some adjustments to enhance the screen brightness and voice according to an outside situation.

The pressure data are obtained by the pressure sensors set under the armrest of the sofa, under the cushion of the sofa and behind the backrest of the sofa, or by the pressure sensors arranged on the user body, when the user is sitting in a sofa. The vital signs data are obtained by the pressure sensors set under the armrest of the bed, under the cushion of the bed and behind the backrest of the bed, or by the pressure sensors arranged on the user body, when the user is lying in a bed.

In order to achieve a better intelligence of the intelligent TV, the pressure sensor further comprises a GPS positioning module, applied to locating a current position, and transmitting the position information to the terminal of intelligent TV through the data transmission module.

The intelligent TV further includes: a user information storage module, applied to storing a history information on the user watched TV, as well as analyzing an information on user loved programs according to a history information on the user watched TV; a user identification module, applied to comparing the pressure data and the vital signs data obtained from the terminal of pressure sensor with the body weight information of the user stored in the user information storage module, before identifying the user currently watching the TV.

The instruction delivery and control module further comprises: a screen adjustment and control unit, applied to controlling the TV screen to adjust correspondingly, according to the user sitting posture information obtained from the data processing module; an instruction control unit, applied to controlling to turn the TV on and off, controlling to increase or decrease a volume of the TV, controlling to increase or decrease a screen brightness of the TV, according to the mental state information of the user.

The intelligent TV may identify the user according to the pre-stored user information, so as to play directly a loved TV program in the user's history record, or recommend the user a TV program he loves, that improves its intelligence.

Combining with FIG. 2, which illustrates a schematic diagram on an embodiment of the control system of an intelligent TV as provided in the present invention, a further description to the modules or units is stated below. When using the system to control the intelligent TV, the user need first buy a whole set of pressure censoring devices, including the pressure sensors, which are paired with the intelligent TV at home, before being placed under the cushion of the sofa, behind the backrest, under the armrest. If the intelligent TV is in a standby state, as long as the user sits in the sofa, the cushion, backrest and armrest will all obtain the force information of the user, which is then transmitted to the intelligent TV through a wireless agreement, which will make a corresponding action according to the information analysis. According to a plurality of data on a sitting force and a range of the sitting force, the intelligent TV may determine a role of the user, that is, which member in the family he is, before the intelligent TV opens instantly the program history data showing what the user viewed last time. According to the data information of the user's sitting posture and the backrest, the intelligent TV determines if the user's sitting posture is on left or on right, if so, the intelligent TV will control the screen thereof to rotate and stretch, helping the user keep the sitting posture balanced left and right, and keep the backrest force equal. The pressure sensors feed back the pressure data and the vital signs data to the intelligent TV in a real time, after the terminal of intelligent TV obtains the information of the heartbeat and the pulse approaching stable and weaker, it weakens the brightness of the screen and the volume of the TV speaker, followed by monitoring the information of pressure data and vital signs data from the terminal of pressure sensors. Once it obtains the information including the body temperature of the user decreasing and more, the TV will automatically go to a standby mode, and make other intelligent devices around build an environment for sleeping together. The pressure sensors are still working when the TV is in the standby mode, once a plurality of significant moving signs of the user body is detected (the data of the pressure sensors have a plurality of significant variations), the intelligent TV will control it restart automatically, showing the history data of what is watched last time.

The present invention further discloses an implementation method of the intelligent TV control system after disclosing the system, shown as FIG. 3. The method includes: S1, establishing a wireless connection between the group of pressure sensors and the intelligent TV, and storing the body weight information of the user in the intelligent TV; S2, the group of pressure sensors collects the pressure data and vital signs data of a plurality of body parts of the user; before delivering to the terminal of intelligent TV; S3, the intelligent TV compares and analyzes the pressure data received from the terminal of pressure sensors with the stored body weight information of the user, before obtaining the sitting posture information of the user, and the mental state information of the user based on the vital signs data, followed by transmitting a plurality of corresponding advices for adjusting the sitting posture or controlling a play state of the TV, based on the sitting posture information and mental state information.

At a same time of a data obtaining module containing the group of pressure sensors collecting the pressure data and the vital signs data of a plurality of body parts of the user, it further positions its current location, before transmitting its location information to the terminal of intelligent TV.

Before setting up the wireless connection between the group of pressure sensors and the intelligent TV, the method further includes: storing the body weight information of the user and the user loved program information analyzed through the history information of the user watched TV.

The implementation method further includes: comparing the pressure data and the vital signs data received by the terminal of pressure sensors with the stored body weight information of the user, before identifying the user currently watching TV.

The step of transmitting a plurality of corresponding advices for adjusting the sitting posture or controlling a play state of the TV, based on the sitting posture information and mental state information includes: if it is analyzed that, the sitting posture information of the user is on the left, then the TV screen is controlled to turn right; if it is analyzed that, the sitting posture information of the user is on the right, then the TV screen is controlled to turn left; if it is analyzed that, the sitting posture information of the user is leaning forward, then the TV screen is controlled to move forward.

The step of transmitting a plurality of corresponding advices for adjusting the sitting posture or controlling a play state of the TV, based on the sitting posture information and mental state information includes: if it is analyzed that, the mental state information of the user is approaching sleeping from quiet, then the TV is controlled to lower the TV volume gradually according to a preset period, and lower the brightness of the TV screen gradually as well; if it is analyzed that, the mental state information of the user is sleeping, then the TV is controlled to shut down; if it is analyzed that, the mental state information of the user is going to be exciting from quiet, the TV is then controlled to increase the TV volume gradually according to a preset period, and increase the brightness of the TV screen gradually as well; if it is analyzed that, the mental state information of the user is going to be quiet from sleeping, the TV is then controlled to turn on.

It should be noted that, the control system and the implementation method described in the present invention, may also be applied to control other intelligent electric home appliances. For example, if the pressure data and vital signs data of the user obtained from the pressure sensors have shown that the user is entering a sleep state, then it may also control at a same time, closing a curtain of a window, and turning off the light to weaken the outside brightness, through sending out a wireless control instruction, as well as turning on an AC to control a room temperature suitable for sleep, so as to make the home electric appliances serve the user better.

The present invention provides an intelligent TV control system and implementation method thereof, through a group of pressure sensors, the pressure data and vital signs data of a plurality of body parts of the user are collected; before being transmitted to the terminal of intelligent TV, which then processes the pressure data and the vital signs data received from the terminal of pressure sensors, and obtains the sitting posture information and mental state information of the user, before sending out a corresponding sitting posture adjustment advice or controlling to change the play state of the TV, based on the sitting posture information and the mental state information. The system and the implementation method thereof, as described in the present invention, by obtaining the user state information, and controlling the TV to adjust parameters automatically according to the user state information, has improved an intelligence of the intelligent TV, and provided convenience to users when using the intelligent TV.

It should be understood that, the application of the present invention is not limited to the above examples listed. Ordinary technical personnel in this field can improve or change the applications according to the above descriptions, all of these improvements and transforms should belong to the scope of protection in the appended claims of the present invention.

What is claimed is:
1. An intelligent television (TV) control system comprising:
    an intelligent TV; and
    a pressure data obtaining device comprising at least a pressure sensor;
    wherein the pressure sensor comprises:
    a data collector collecting a plurality of pressure data on a plurality of body parts of a user, and a plurality of vital signs data of the user;
    a communication connector establishing a wireless connection with the intelligent TV; and
    a data transmitter transmitting the plurality of pressure data and the plurality of vital signs data to a terminal of the intelligent TV, through the wireless connection;
    wherein the intelligent TV comprises:
    a TV wireless communication interface establishing the wireless connection with the communication connector;
    a user information storage storing an information of a body weight of the user;
    a data processor obtaining the plurality of pressure data and the plurality of vital signs data from the data transmitter via the TV wireless communication interface, and comparing the plurality of pressure data with the stored body weight information of the user to obtain a sitting posture information of the user, and obtaining a mental state information of the user according to the plurality of vital signs data; and an instruction controller automatically delivers a corresponding TV instruction based on the sitting posture information and the mental state information, and controlling the intelligent TV to execute a corresponding operation;

wherein, the instruction controller performs:
automatically controlling to turn the intelligent TV on or off, controlling to increase or decrease a volume of the intelligent TV, controlling to increase or decrease a screen brightness of the intelligent TV, according to the mental state information of the user;

wherein the corresponding TV instruction reminds the user to adjust the user's sitting posture, and the corresponding operation of the intelligent TV automatically controls a TV screen turning to make the user adjusting the user's sitting posture;

the TV screen turning comprises, using a screen controller, controlling the TV screen of the intelligent TV to automatically adjust correspondingly, according to the user sitting posture information obtained from the data processor, the TV screen turning comprises:
in response to the sitting posture information of the user is on a left, then the TV screen is controlled to turn right;
in response to the sitting posture information of the user is on a right, then the TV screen is controlled to turn left;
in response to the sitting posture information of the user is leaning forward, then the TV screen is controlled to move forward; and the intelligent TV stops displaying a current content being displayed on the TV screen until the user adjusts the user's sitting posture.

2. The intelligent TV control system according to claim 1, wherein, the pressure sensor further includes:
a GPS device locating a current position, and transmitting a position information to the terminal of the intelligent TV through the data transmitter.

3. The intelligent TV control system according to claim 2, wherein the automatically controlling to turn the intelligent TV on or off, controlling a volume of the intelligent TV to increase or decrease, controlling a screen brightness of the intelligent TV to increase or decrease, according to the mental state information of the user, includes:
in response to the mental state information of the user is approaching sleeping from quiet, then the intelligent TV is automatically controlled to lower the intelligent TV volume gradually according to a preset period, and lower the brightness of the TV screen gradually as well;
in response to the mental state information of the user is sleeping, then the intelligent TV is automatically controlled to shut down;
in response to the mental state information of the user is going to be exciting from quiet, the intelligent TV is then automatically controlled to increase the intelligent TV volume gradually according to a preset period, and increase the brightness of the TV screen gradually as well;
in response to the mental state information of the user is going to be quiet from sleeping, the intelligent TV is then automatically controlled to turn on.

4. An intelligent television (TV) control system comprising:
an intelligent TV; and
a pressure data obtaining device comprising at least a pressure sensor;
wherein the pressure sensor comprises:

a data collector collecting a plurality of pressure data on a plurality of body parts of a user, and a plurality of vital signs data of the user;
a communication connector establishing a wireless connection with the intelligent TV;
a data transmitter transmitting the plurality of pressure data and the plurality of vital signs data to a terminal of the intelligent TV, through the wireless connection;

wherein the intelligent TV comprises:
a TV wireless communication interface establishing the wireless connection with the communication connector;
a user information storage storing an information of a body weight of the user;
a data processor obtaining the plurality of pressure data and the plurality of vital signs data from the data transmitter via the TV wireless communication interface, and comparing the plurality of pressure data with the stored body weight information of the user, to obtain a sitting posture information of the user, and obtaining a mental state information of the user according to the plurality of vital signs data;
an instruction controller automatically delivers a corresponding TV instruction based on the sitting posture information and the mental state information, and controlling the intelligent TV to execute a corresponding operation;

wherein, the instruction controller performs:
automatically controlling to turn the intelligent TV on or off, controlling to increase or decrease a volume of the intelligent TV, controlling to increase or decrease a screen brightness of the intelligent TV, according to the mental state information of the user;

wherein the corresponding TV instruction reminds the user to adjust the user's sitting posture, and the corresponding operation of the intelligent TV automatically controls a TV screen turning to make the user adjusting the user's sitting posture;

the TV screen turning comprises, using a screen controller, controlling the TV screen of the intelligent TV to automatically adjust correspondingly, according to the user sitting posture information obtained from the data processor, the TV screen turning comprises:
in response to the sitting posture information of the user is on a left, then the TV screen is controlled to turn right;
in response to the sitting posture information of the user is on a right, then the TV screen is controlled to turn left;
in response to the sitting posture information of the user is leaning forward, then the TV screen is controlled to move forward; and
the intelligent TV stops displaying a current content being displayed on the TV screen until the user adjusts the user's sitting posture; and wherein the user information storage further stores a history information of TV programs watched by the user, and analyzes an information on a user loved program according to the history information of TV programs watched by the user; and a user identifier compares the plurality of pressure data and the plurality of vital signs data obtained from the terminal of pressure sensors with the body weight information of the user stored in the user information storage to identify the user currently watching television program on the intelligent TV.

5. The intelligent TV control system according to claim 4, wherein, the plurality of pressure data and the plurality of vital signs data are respectively:
   in response to the user is sitting in a sofa, the plurality of pressure data are obtained by the pressure sensors set under the armrest of the sofa, under the cushion of the sofa and behind the backrest of the sofa, or by the pressure sensors arranged on the user body;
   in response to the user is lying in a bed, the plurality of vital signs data are obtained by the pressure sensors set under the armrest of the bed, under the cushion of the bed and behind the backrest of the bed, or by the pressure sensors arranged on the user body.

6. The intelligent TV control system according to claim 4, wherein, the pressure sensor further comprises:
   a GPS device locating a current position, and transmitting a position information to the terminal of the intelligent TV through the data transmitter.

7. An implementation method of an intelligent television (TV) control system comprising:
   establishing a wireless connection between a group of pressure sensors and an intelligent TV, and storing, by a user information storage, a body weight information of a user in the intelligent TV;
   collecting, by a data collector, a plurality of pressure data and a plurality of vital signs data of a plurality of body parts of the user by the group of pressure sensors and delivering, via a TV wireless communication interface, the plurality of pressure data and the plurality of vital signs data to a terminal of the intelligent TV;
   comparing and analyzing, by a data processor, the plurality of pressure data received from the terminal of pressure sensors with the stored body weight information of the user, and obtaining a sitting posture information of the user and a mental state information of the user based on the plurality of vital signs data; and
   transmitting, by a data transmitter, a plurality of corresponding advices for adjusting the sitting posture and automatically controlling a play state of the intelligent TV, based on the sitting posture information and the mental state information, wherein automatically controlling the play state comprising:
   automatically controlling to turn the intelligent TV on or off, controlling to increase or decrease a volume of the intelligent TV, controlling to increase or decrease a screen brightness of the intelligent TV, according to the mental state information of the user;
   wherein the plurality of corresponding advices remind the user to adjust the user's sitting posture, and
   the automatically controlling the play state of the intelligent TV automatically controls a TV screen turning to make the user adjusting the user's sitting posture;
   the TV screen turning comprises controlling the TV screen to automatically adjust correspondingly, according to the sitting posture information, the TV screen turning comprises:
   in response to the sitting posture information of the user is on a left, then the TV screen is controlled to turn right;
   in response to the sitting posture information of the user is on a right, then the TV screen is controlled to turn left;
   in response to the sitting posture information of the user is leaning forward, then the TV screen is controlled to move forward; and
   the intelligent TV stops displaying a current content being displayed on the TV screen until the user adjusts the user's sitting posture.

8. The implementation method of an intelligent TV control system according to claim 7, wherein, when collecting the plurality of pressure data and the plurality of vital signs data of the plurality of body parts of the user by the group of pressure sensors, further comprises:
   positioning a current location, and transmitting a location information to the terminal of the intelligent TV.

9. The intelligent TV control system implementation method according to claim 7, before establishing the wireless connection between the group of pressure sensors and the intelligent TV, further comprising:
   storing the body weight information of the user and a user loved program information, the user loved program information being analyzed through a history information of TV programs watched by the user; and
   comparing the plurality of pressure data and the plurality of vital signs data received by the terminal of pressure sensors with the stored body weight information of the user, and identifying a user currently watching intelligent TV.

10. The intelligent TV control system implementation method according to claim 9, wherein, transmitting a plurality of corresponding advices for adjusting the sitting posture and automatically controlling a play state of the intelligent TV, based on the sitting posture information and the mental state information, comprises:
   in response to the mental state information of the user is approaching sleeping from quiet, then the intelligent TV is controlled to lower the intelligent TV volume gradually according to a preset period, and lower the brightness of the TV screen gradually as well;
   in response to the mental state information of the user is sleeping, then the intelligent TV is controlled to shut down;
   in response to the mental state information of the user is going to be exciting from quiet, the intelligent TV is then controlled to increase the intelligent TV volume gradually according to a preset period, and increase the brightness of the TV screen gradually as well; and
   in response to the mental state information of the user is going to be quiet from sleeping, the intelligent TV is then controlled to turn on.

* * * * *